United States Patent [19]

Johnson et al.

[11] 4,424,287
[45] Jan. 3, 1984

[54] POLYMER FOAM PROCESS

[75] Inventors: D. Emil Johnson, Canandaigua; Charles M. Krutchen, Pittsford; G. Vincent Sharps, Jr., Fairport, all of N.Y.

[73] Assignee: Mobil Oil Corporation, New York, N.Y.

[21] Appl. No.: 272,155

[22] Filed: Jun. 10, 1981

Related U.S. Application Data

[63] Continuation-in-part of Ser. No. 158,187, Jun. 10, 1980, abandoned, and Ser. No. 205,353, Nov. 10, 1980, Pat. No. 4,344,710.

[51] Int. Cl.³ ............................................. B29D 27/00
[52] U.S. Cl. ..................................... 521/74; 264/50; 264/53; 264/DIG. 5; 264/321; 521/97; 521/133
[58] Field of Search .................... 264/53, 50, DIG. 5, 264/321; 521/74, 97, 133

[56] References Cited

U.S. PATENT DOCUMENTS

| 2,928,130 | 3/1960 | Gray | 264/50 |
|---|---|---|---|
| 3,160,688 | 12/1964 | Aykanian et al. | 264/53 |
| 3,238,565 | 3/1966 | Jacobs | 264/321 X |
| 3,287,477 | 11/1966 | Vesilind | 264/53 |
| 3,327,031 | 6/1967 | Boyer et al. | 264/53 |
| 3,374,300 | 3/1968 | Azuma | 264/53 X |
| 3,444,283 | 5/1969 | Carlson, Jr. | 264/53 |
| 3,523,988 | 8/1970 | Roehr et al. | 264/50 X |
| 3,538,203 | 11/1970 | Overcashier et al. | 264/53 |
| 3,676,537 | 7/1972 | Winstead | 264/321 X |
| 3,723,582 | 3/1973 | Winstead | 264/321 X |
| 3,787,542 | 1/1974 | Gallagher et al. | 264/53 X |
| 3,789,095 | 1/1974 | Winstead | 264/321 X |
| 3,981,649 | 9/1976 | Shimano et al. | 264/50 X |
| 4,107,354 | 8/1978 | Wilkenloh et al. | 264/50 X |
| 4,344,710 | 8/1982 | Johnson et al. | 264/53 X |

Primary Examiner—Philip E. Anderson
Attorney, Agent, or Firm—Alexander J. McKillop; James F. Powers, Jr.; John K. AboKhair

[57] ABSTRACT

Thermoplastic foams of polystyrene, for example, are prepared with a blowing agent which is a mixture of an organic plasticizing blowing agent, such as pentane, and an atmospheric gas, such as carbon dioxide. Typically, such foams prepared with organic blowing agent alone were aged prior to thermoforming the foam into articles. Foams prepared with the mixed blowing agent of this invention exhibit the advantage of reduced atmospheric emissions on aging.

28 Claims, 1 Drawing Figure

POLYMER FOAM PROCESS

REFERENCE TO COPENDING APPLICATIONS

This application is a continuation-in-part of U.S. patent applications Ser. No. 158,187, filed June 10, 1980, and now abandoned, for POLYSTYRENE FOAM EXTRUSION METHODS, and Ser. No. 205,353, now U.S. Pat. No. 4,344,710 filed Nov. 10, 1980, for POLYMER FOAM EXTRUSION SYSTEM. Both of the foregoing applications are incorporated herein by reference, in their entirety.

BACKGROUND OF THE INVENTION

In the manufacture of polystyrene foam sheet, rod, or other stock materials, the method wherein heated and pressurized styrene resin is mixed with its foaming agent and then is extruded to a low pressure zone is well known and widely used. The foam is then subjected to a thermoforming step to make articles such as foam cups, and meat trays. A variety of gaseous and liquid organic blowing agents such as propane, butane, pentane, and "Freons", have a solvating effect toward styrene resins and are commonly used. If the solvating effect is too great, deficiencies, such as sagging of the foam sheet are encountered during subsequent thermoforming. This is due to the strong affinity of such blowing agents for styrene resin. Thus, when the foam is extruded, the blowing agent remains in the cell walls of the styrene resin foam obtained. Therefore, the foam material produced by the above method must be aged to permit evaporation of the blowing agent prior to thermoforming. Otherwise, when the temperature of the foam rises above the softening point of the resin, as required by the thermoforming process, and excess foaming agent is still present, sagging of the foam sheet will occur, destroying the shape, form, and surface of the thermoformed article. Therefore, following a typical extrusion foaming step, the stock material is ordinarily aged before thermoforming into containers or the like. During aging the foam cells and polymeric matrix become partially depleted of volatile hydrocarbons, which enter the atmosphere, generally as non-toxic, odorless materials. However, potential atmospheric contamination by these by-products of foam manufacture has led workers to seek non-polluting alternative blowing agents, such as the usual atmospheric gases, e.g., nitrogen, carbon dioxide, etc.

Extreme volatility of most of these normally gaseous materials, however, has posed a considerable problem in controlling the foaming process, resulting in surface defects such as corrugations in the sheet product. Despite numerous attempts to solve this problem atmospheric gases have not been successfully employed in continuous direct injection foam sheet manufacturing. In order to overcome these problems, the method of this invention has been devised whereby both volatile plasticizing organic blowing agent and atmospheric gas liquid are used in a molten extrusion mass in a continuous extruder unit.

Applicants' early attempts to mix normally liquid hydrocarbons and normally gaseous blowing agents were not successful. In U.S. Pat. No. 3,160,688 (Aykanian et al) a mixed blowing agent containing as little as 70 weight percent hydrocarbon and up to 30 percent $CO_2$ is disclosed for direct injection of blowing agent into a polystyrene extrusion mass. Great care must be exercised in production of polymer foam with highly-volatile blowing agents, such as $CO_2$, even in mixture. As part of the present invention a novel start-up procedure has been developed to overcome uncontrolled foaming prior to establishing steady state manufacturing conditions.

A significant advantage is obtained in post-extrusion treatment of foams made with a mixture of organic blowing agents and atmospheric gas, in accordance with this invention. In prior practice, aging of the foamed polymer has been found necessary to permit migration of excess hydrocarbon out of the closed gas cells of the foam into the atmosphere and migration of atmospheric gases into the foam to effect blow-up. It has been discovered that foams made according to this invention produce a markedly reduced emission rate of the organic blowing agent such as pentane, can be directly thermoformed without aging, and are of improved tensile strength.

SUMMARY OF THE INVENTION

In accordance with the present invention, the amount of volatile plasticizing organic blowing agents which is required to produce commercially acceptable foam products, has been reduced by substituting a second atmospheric gas blowing agent for a substantial amount of the organic blowing agent. The atmospheric gas, being more volatile than the liquid organic blowing agent, enhances the aging process after foam extrusion. The present invention achieves a reduction in the emission of organic blowing agent into the atmosphere and within the environs of foam production facilities. The present invention reduces pollution of the atmosphere and fire hazard potential in the production facilities and achieves a reduction in cost due to the avilability and lower cost of atmospheric gases. Furthermore, the foam produced in accordance with the present invention can be directly thermoformed without any substantial aging.

DESCRIPTION OF PREFERRED EMBODIMENTS

Figure 1:
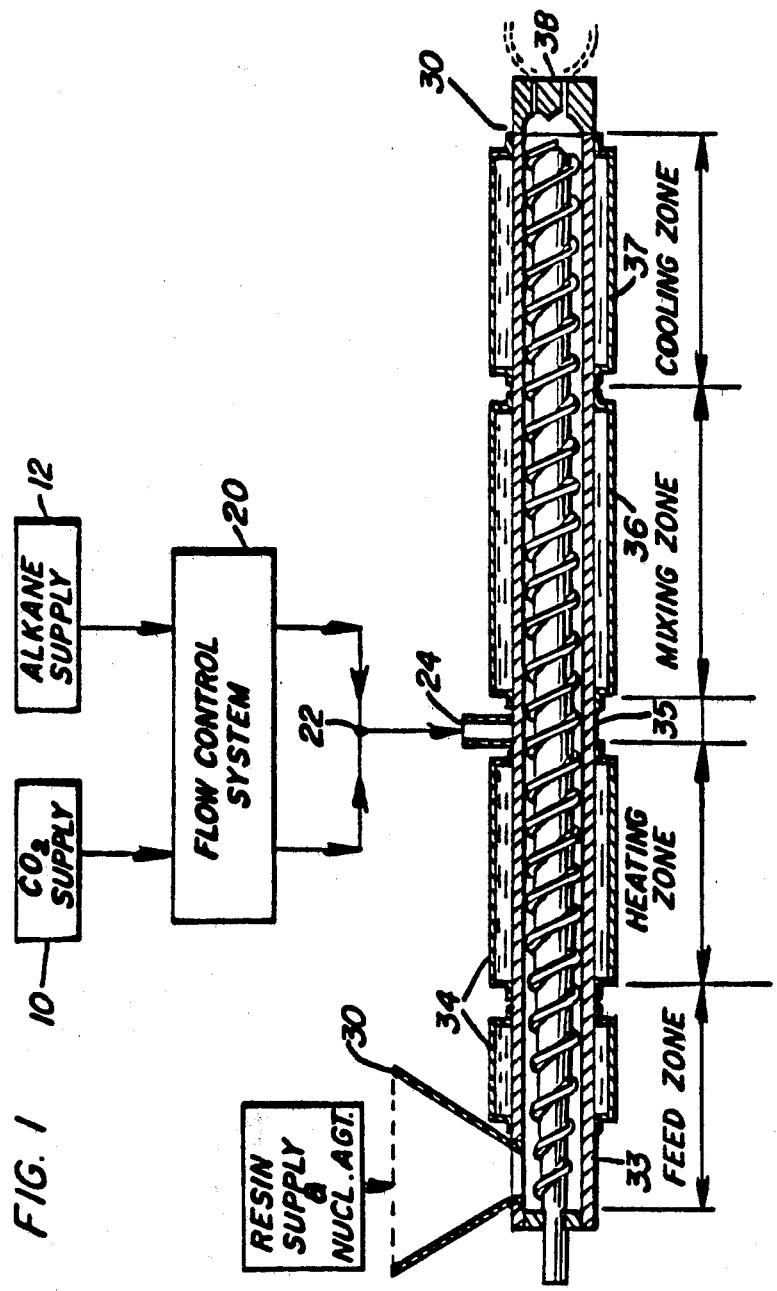
FIG. 1 is a cross-sectional view of a direct injection thermoplastic foam extrusion system showing an embodiment of the present invention.

An application entitled "POLYMER FOAM EXTRUSION SYSTEM", Ser. No. 205,353, filed Nov. 10, 1980 now U.S. Pat. No. 4,344,710, is directed to the system in which the present invention and similar processes can be applied. In the above application, incorporated herein by reference, a continuous foam production system is disclosed, as shown in FIG. 1 wherein molten thermoplastic resin is mixed with volatile blowing agent at elevated pressure to form an extrusion mass. A helical screw extruder means is adapted to extrude the molten resin with volatile blowing agent into a low pressure foaming zone to form a foam sheet, tube or other shape. An improved fluid handling system includes storage means for holding at least one of a plurality of disparate volatile liquids under pressure sufficient to maintain a normally gaseous blowing agent in liquified state and cooling means for receiving a pressurized first stream of liquified thermally gaseous blowing agent and cooling below its autogenous temperature. A pump operatively connected between the cooling means and extruder means increases pressure of the first stream higher than the elevated pressure of the extruder, where it may be combined with a pressurized stream of second liquid blowing agent. Flow control means is provided for injecting a predetermined amount of disparate liquid blowing agents from the first and second streams into the extruder means at elevated pressure to form an extrusion mass. This system is a modification of the well known screw-type extruder with the improvement consisting of additional mechanisms for the high pressure introduction of a predetermined amount of at least one blowing agent into the molten resin stage.

In accordance with the present invention, the amount of volatile plasticizing organic blowing agent which is required to produce commercially acceptable foam products has been reduced by substituting a second atmospheric gas blowing agent for a substantial amount of the organic blowing agent. It is well known to operate extrusion units without the presence of atmospheric gas in the blowing agent and starting these can be achieved without undue problems or excessive product loss. Start-up with even a minor amount of atmospheric gas in the blowing agent may prove troublesome due to extreme volatility. A technique has been found for operating the unit successfully during this phase. First, the thermoplastic resin is fed through the heating zone, optionally along with an effective amount of nucleating agent as described in U.S. Pat. No. 3,444,283 (Carlson), incorporated herein by reference. The initial volatile plasticizing organic blowing agent is introduced to the molten thermoplastic resin to give a highly plasticized extrusion mass which is easily handled. After reaching steady state condition for the continuous extrusion process, the atmospheric gas is bled into the blowing agent stream while a proportionate decrease in the initial volatile plasticizing organic agent is effected. This change-over can be achieved by manual control of two independently operated flow measurement and control subsystems, or an automatically programmed flow ratio control system can link plural flowlines. For any particular extrusion system and combination of blowing agents a desirable blend can be determined empirically by examining the product density, surface variation, etc.

While it is advantageous to join the mixed blowing agents in conduit means prior to injection into the extruder, it is understood that separate injection inlets can be employed if desired. It is believed that by joining a first normally liquid stream of volatile plasticizing organic blowing agent and a second normally gaseous liquid stream prior to introducing the combined streams into the injection zone, that co-dissolution of these liquids may be enhanced. Nonsignificant increase of energy for operating the extrusion screw is observed for mixed blowing agent systems employing atmospheric gas to replace a portion of the initial volatile plasticizing organic blowing agent. This is unexpected in view of the reduction of a known plasticizer component, which would ordinarily be expected to substantially increase the viscosity of the extrusion mass.

A styrenic polymer foam extrusion system can be operated with a variety of blowing agents within the inventive concept. Lower alkanes, halogenated hydrocarbons, carbon dioxide, nitrogen and numerous other volatile materials are generally soluble in the hot molten thermoplastic resin under operating pressure which is normally above 2,000 psig. The halogenated hydrocarbons and the $C_4$ to $C_6$ alkanes including n-butane, isobutane, n-pentane, isopentane, n-hexane, etc., are sufficiently volatile to form gas cells during the foaming step. They are also unhindered with respect to resin permeability, permitting exchange of these volatile components with air. The $C_4$ to $C_6$ alkanes may be employed as single components or in mixture thereof, although pentane and/or isopentane are preferred.

Thermoplastic resins of various types may be employed for making foam articles, especially amorphous linear addition polymers of ethylenically-unsaturated monomers, such as styrene, p-methylstyrene, ethylene or other alpha-olefins, acrylics, etc. The preferred materials are styrenic homopolymers or interpolymers containing a predominate amount of styrene or substituted styrene. Commercially available polystyrene, such as Dow 685, or similar general purpose resins manufactured by Mobil Chemical Company and Foster Grant, can be employed in the system.

EXAMPLE 1

As an example of a continuously operated system according to this invention, carbon dioxide stored at room temperature (20° C.) is forced out of its storage container by its autogenous (saturation) pressure (about 58 atmospheres) through a refrigerated heat exchanger wherein it is cooled to about 0° C. to 5° C. Maintaining the pressure while cooling assures that the carbon dioxide leaving the heat exchanger is in a supercooled liquid state, i.e., below its autogenous temperature. From the heat exchanger this first stream is fed to a pump which increases the pressure on the liquid carbon dioxide to an elevated injection pressure of about 340 atmospheres. At this pressure, liquid carbon dioxide may be injected with a precisely controlled flow into the extrusion system. Throughout the system which handles the liquid carbon dioxide, care must be taken to ensure that the pressure within the system does not drop below about 5 atmospheres to avoid solidification of the carbon dioxide and subsequent plugging of the injection lines.

Polystyrene foam is produced in accordance with direct injection extrusion system, with 3.6 parts by weight of isopentane and 1.8 parts by weight of $CO_2$ per 100 parts by weight of polystyrene resin. Polystyrene resin pellets having a melt index of about 4.5 are fed to the feed hopper of a commercially available tandem helical screw extruder. The heating section has a length to diameter ratio of 32:1. As the polystyrene resin pellets are being fed into the feed hopper of the extruder, a mixture of sodium bicarbonate and citric acid nucleating agents in powdered form are admixed with the resin pellets. The nucleating agents mixture constitutes 0.3 parts by weight per 100 parts of polystyrene resin feed. The ratio of sodium bicarbonate to citric acid is 1.3:1. The feed mixture is urged forward by the helical screw within the barrel of the extruders as it is mixed, compressed, heated to about 235° C., and converted to a molten form prior to reaching the injection zone for addition of the blowing agent mixture. Approximately 5.4 weight percent of the mixture of liquid carbon dioxide and isopentane is injected at about 210 atmospheres and 15° C. through the barrel of the extruder into the molten resin. Following fluid injection, blowing agent mixture and the polystyrene resin-nucleating agent mixture are continuously mixed in a primary extruder and subsequently passed through a hollow adaptor section into a secondary cooled tandem extruder. The secondary extruder screw has a length to diameter ratio of about 30:1. The molten mixture is passed along the length of the cooled extruder where additional mixing takes place, and is expressed through a suitable die affixed to the discharge end of the secondary extruder. The temperature of the foam as it is extruded in the form of a hollow tube from the tubular die orifice is about 150° C.

Injection rates for alkanes, and $CO_2$ respectively, may vary from about 2 to 5 parts and 0.5 to 5 parts per 100 parts by weight of thermoplastic resin. It is preferred to maintain these disparate liquids in a closely controlled weight portion from about 3:1 to 1:1 pentane:$CO_2$. It is understood that other non-deleterious blowing agents or other additives may be incorporated into the extrusion mass. Dyes, pigments, stabilizers and anti-oxidants may be employed, as known to the skilled worker.

EXAMPLE 2

The procedure of Example 1 was followed with the exception that 100% isopentane was employed as the sole blowing agent in the extrusion operation. Thus, in this case, 5.4 weight percent of isopentane was added as the blowing agent.

Upon comparing the products of the above experiments, it was determined that when a substantial portion of the isopentane blowing agent was replaced with carbon dioxide, the resultant foam sheet exhibited physical properties which were at least equivalent to foam sheets produced with 100% isopentane and often times superior hereto. The following Table 1 summarizes the comparison results.

TABLE 1

| Foam Sheet Properties | $CO_2$/Iso-Pentane | Iso/Pentane |
|---|---|---|
| *Basis Weight (gm/100 in$^2$) | 10.4 | 10.1 |
| Thickness (in) | .130 Nom. | .130 Nom. |
| Volatile Content (%) | 4.3 | 6.0% |
| Blow Up (% Chg.) | 1.44 | 2.1 |
| Shrinkage: | | |
| MD/TD (%) | 16/13 | 14/11 |
| Tensile properties: | | |
| MD modulus (PSI) | 4700 | 6100 |
| TD modulus (PSI) | 4800 | 5500 |
| MD tensile strength (PSI) | 110 | 118 |
| TD tensile strength (PSI) | 113 | 99 |
| MD elong to break (%) | 5.2 | 3.6 |
| TD elong to break (%) | 5.3 | 2.4 |
| MD toughness (in-lbs) | 1.07 | 0.71 |
| TD toughness (in-lbs) | 1.27 | 0.34 |

*basis weight $\frac{(gm/100\ in^2)}{gauge\ (in)} \times .038 = $ density $\frac{(lb)}{ft^3}$ As can be seen from the foregoing Table, the strength of thermoformed tray structures produced utilizing the combination carbon dioxide-isopentane blowing agent mixture of the present invention is at least equivalent to and actually slightly superior to the trays produced with the 100% prior art pentane blowing agent system of Example 2.

In the following Table 2, the physical properties of conventional polystyrene foam meat tray structures which were fabricated from foam produced in accordance with Examples 1 and 2 are compared. Both extruded foam sheets were aged two days before thermoforming.

TABLE 2

| Sheet Type | No. of Samples | Tray Weight (grams) | Gauge of tray Bottom (mils) | Tray Strength (lbs.)* side-to-side | (end-to-end) |
|---|---|---|---|---|---|
| Example 1 | 20 | 6.2 | 165 | 3.15 lbs. | 3.45 |
| Example 2 | 10 | 6.3 | 167 | 3.05 lbs. | 3.35 |

*Side-to-side and end-to-end strengths rate measured by subjecting the trays to compressive loading on a conventional Instron Tester at a rate of 20 in/min on the crosshead and measuring the maximum load for the tray before failure occurs.

In a further test of the physical properties of the polystyrene trays which were thermoformed from the foam material produced in accordance with Examples 1 and 2, respectively, these trays were overwrapped on commercial tray wrapping equipment to evaluate their performance. The wrapping equipment employed was a commercially available Weldotron tray wrapping machine and a commercially available Hobart tray wrapping machine. These machines are commonly used in the industry today to overwrap polystyrene meat trays with film material such as polyethylene film, for example. These two machines typify the two main approaches to obtaining a tray tightly wrapped with film. The Hobart accomplishes a tight wrap by wrapping a shrink film loosely around the filled tray and then passing it through a heated tunnel to shrink the film into tight conformation with the tray. Most of the tray damage usually encountered on the Hobart machine is caused by mechanical handling in the machine. The Weldotron accomplishes a tight wrap by wrapping a stretch film held under tension around the tray. Damages to trays normally encountered on the Weldotron apparatus is caused by stresses applied by the highly tensioned film.

As can be seen from the following Table 3, polystyrene foam trays which were fabricated from foam material produced in accordance with Example 1 were of better quality and strength than those trays fabricated from the prior art foam material produced in accordance with Example 2.

TABLE 3

| SHEET TYPE | DAMAGE WELDOTRON* A | B | C | D | TOTAL TRAYS | DAMAGE HOBART* A | B | C | D | TOTAL TRAYS | AVE. WT. (GRAMS) | BOTTOM GAUGE (MILS) | SIDEWALL GAUGE (MILS) |
|---|---|---|---|---|---|---|---|---|---|---|---|---|---|
| Example 1 | 5 | 35 | 39 | 0 | 80 | 0 | 79 | 1 | 0 | 80 | 8.2 | 163 | 163 |
| Example 2 | 3 | 8 | 65 | 4 | 80 | 0 | 52 | 28 | 0 | 80 | 8 | 174 | 165 |

*A—No Damage
B—Sidewall Bending
C—Sidewall Break
D—Sidewall & Bottom Damage

Although it is difficult to quantify in terms of actual data, and the mechanism of the phenomenon is not completely understood, a further advantage which has been found when employing the blowing system of the present invention is the pronounced reduction of hydrocarbon emissions into the atmosphere which occurs at the foam manufacturing site. It has been found that the bulk of atmospheric pollution resulting from the emission of the hydrocarbon into the atmosphere occurs during the extrusion, aging, and thermoforming of the sheet structure and during the conversion of the scrap material formed during thermoforming into reusable reclaim by grinding such scrap into a "fluff" and passing it through a pelletizer for reuse in the extrusion operation. The volatile plasticizing organic blowing agents normally used in the industry such as "Freons" and $C_4$ to $C_6$ alkanes are regulated by the Environmental Protection Agency. Thus a reduction in the emission of such blowing agents into the environs of manufacture is advantageous. While reducing the fire and health hazards, such reduction would also allow an increase in output. According to the present invention, it is not necessary to age the foam before thermoforming but even if the foam is aged, the emission of pollutants into the air is substantially reduced. The reduction in pollutant emission is greater than the expected reduction due to the corresponding decrease in organic blowing agent use.

Thus the present invention provides foam with improved tensile strength wherein the foam can be thermoformed into articles without aging. Furthermore, the process of production allows for reduced emission of pollutants into the environs of manufacture thus reducing the fire and health hazards while also reducing the air pollution.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for the formation of a thermoplastic foam which comprises
   introducing to a molten thermoplastic resin a blowing agent comprising at least one atmospheric gas and at least one volatile plasticizing blowing agent in amounts sufficient to plasticize said thermoplastic resin;
   extruding said thermoplastic in the form of a foam; and
   thermoforming said foam into articles; wherein the atmospheric gas is present in sufficient amounts to allow thermoforming immediately after the extrusion of the foam without substantial intermediate aging.

2. A method in accordance with claim 1, wherein said atmospheric gas is carbon dioxide.

3. A method in accordance with claim 1 wherein said volatile plasticizing organic blowing agent comprises an alkane with 4 to 6 carbon atoms or a mixture thereof.

4. A method in accordance with claim 1 wherein said volatile plasticizing organic blowing agent consists essentially of n-pentane, isopentane or mixtures thereof.

5. A method in accordance with claim 1 wherein said thermoplastic consists essentially of polystyrene.

6. A method in accordance with claim 1 wherein said thermoplastic consists essentially of polyparamethylstyrene.

7. A method in accordance with claim 1 wherein the thermoplastic resin consists essentially of polystyrene, the volatile blowing agent comprises up to about 5 parts by weight of a pentane hydrocarbon and up to 5 parts by weight of carbon dioxide per 100 parts of resin.

8. A method in accordance with claim 1 wherein a mixture of citric acid and sodium bicarbonate, in an amount effective for nucleating foam cells, is added to said thermoplastic prior to extrusion thereof.

9. A method in accordance with claim 1 wherein said thermoplastic is extruded in the form of a foam tube.

10. A method in accordance with claim 1 wherein said volatile plasticizing organic blowing agent consists essentially of a halogenated hydrocarbon.

11. A method in accordance with claim 1 wherein the system is started-up without the atmospheric gas; then, atmospheric gas is bled into the blowing agent stream.

12. A method in accordance with claim 1 wherein the extruded foam is thermoformed into articles without any substantial aging.

13. The process of claim 1 wherein the atmospheric gas is present in a sufficient amount to substantially eliminate sagging of the extruded foam upon thermoforming without substantial aging.

14. The process of claim 1 wherein said atmospheric gas is liquified and fed to admixture with said thermoplastic resin in liquid form.

15. A method for the formation of a thermoplastic foam which comprises:
   (a) introducing to a molten thermoplastic resin a blowing agent comprising at least one atmospheric gas and at least one volatile plasticizing blowing agent in amounts sufficient to plasticize said thermoplastic resin;
   (b) extruding said thermoplastic in the form of a foam; and
   (c) thermoforming said foam into articles; wherein the atmospheric gas is present in sufficient amounts to substantially reduce emission of the organic blowing agents into the environs.

16. The process as claimed in claim 15 wherein said atmospheric gas is liquified and fed to admixture with said thermoplastic resin in liquid form.

17. The process of claim 15 wherein said volatile plasticizing organic blowing agent is a $C_4$ to $C_6$ alkane and wherein said atmospheric gas is carbon dioxide.

18. The process of claim 17 wherein the alkane and carbon dioxide are continuously metered at a predetermined flow rate and blended in a weight ratio of about 3:1 to 1:1 respectively.

19. The process of claim 17 wherein alkane:carbon dioxide ratio is about 2:1 respectively.

20. A process in accordance to claim 17 wherein said alkane consists essentially of n-pentane, isopentane, or mixtures thereof.

21. The process of claim 15 wherein the reduction in the amount of organic blowing agent emission into the environs is greater than the expected reduction which is equivalent to the decrease in the amount of organic blowing agent used.

22. A continuous process for thermoplastic foam production comprising the steps of:
   (a) feeding a thermoplastic resin to a screw-type extruder and heating the thermoplastic resin to a first temperature substantially above melting temperature of the resin;
   (b) introducing volatile hydrocarbon and atmospheric gas blowing agent in liquid phase concurrently into the resin while mixing the resin at the first temperature;

(c) cooling the mixture of molten resin and blowing agent to a second temperature below the first temperature and above the melting temperature;

(d) extruding a foamed sheet of the thermoplastic resin by passing the molten mixture through an orifice into a zone of reduced pressure; and (e) thermoforming said extruded foam into articles.

23. The process of claim 22 wherein said atmospheric gas consists essentially of carbon dioxide.

24. The process of claim 22 wherein said volatile hydrocarbon consists essentially of n-pentane, isopentane or mixtures thereof.

25. The process as claimed in claim 22 wherein said orifice is annular.

26. The process of claim 22 wherein the system is started-up without the atmospheric gas; then, the atmospheric gas is gradually bled into the blowing agent stream.

27. The process claimed in claim 26 wherein said atmospheric gas is bled into said blowing agent stream in liquid form.

28. A thermoplastic foam article containing in its porous interstices at least one atmospheric gas and at least one volatile plasticizing organic blowing agent, said organic blowing agent being present in an amount sufficient to allow thermoforming of said foam article without substantial aging as compared to thermoformed thermoplastic foam which does not contain said atmospheric gas within its porous interstices; said foam article emitting a reduced quantity of said organic blowing agent to the atmosphere during the formation of said foam article and thereafter thermoforming thereof.

* * * * *